(12) United States Patent
Naidu et al.

(10) Patent No.: US 10,909,668 B1
(45) Date of Patent: Feb. 2, 2021

(54) ADAPTIVE SUB-TILES FOR DISTORTION CORRECTION IN VISION-BASED ASSISTANCE SYSTEMS AND METHODS

(71) Applicant: NXP USA, Inc., Austin, TX (US)

(72) Inventors: Sharath Subramanya Naidu, Munich (DE); Michael Andreas Staudenmaier, Munich (DE); Chanpreet Singh, Noida (IN); Rahul Jain, Noida (IN)

(73) Assignee: NXP USA, Inc., Austin, TX (US)

( * ) Notice: Subject to any disclaimer, the term of this patent is extended or adjusted under 35 U.S.C. 154(b) by 32 days.

(21) Appl. No.: 16/527,214

(22) Filed: Jul. 31, 2019

(51) Int. Cl.
*G06T 5/00* (2006.01)
*H04N 5/217* (2011.01)

(52) U.S. Cl.
CPC ............. *G06T 5/006* (2013.01); *H04N 5/217* (2013.01)

(58) Field of Classification Search
CPC ................................ G06T 5/006; H04N 5/217
See application file for complete search history.

(56) References Cited

U.S. PATENT DOCUMENTS

| | | | |
|---|---|---|---|
| 8,055,070 B2 | 11/2011 | Bassi et al. | |
| 8,326,077 B2 * | 12/2012 | Chai | H04N 1/387 382/275 |
| 8,928,730 B2 | 1/2015 | Stec et al. | |
| 9,508,132 B2 | 11/2016 | Weber | |
| 9,536,287 B1 | 1/2017 | Eldar | |
| 9,633,419 B2 | 4/2017 | Baek et al. | |
| 2009/0092336 A1 * | 4/2009 | Tsurumi | G06K 9/6282 382/294 |
| 2017/0053172 A1 * | 2/2017 | Nakasu | G06K 9/00778 |
| 2018/0332243 A1 * | 11/2018 | Aihara | H04N 5/217 |
| 2019/0188504 A1 * | 6/2019 | Aihara | G02B 13/08 |
| 2019/0191064 A1 * | 6/2019 | Aihara | H04N 5/23293 |
| 2019/0268584 A1 * | 8/2019 | Leleannec | H04N 13/172 |
| 2019/0273889 A1 * | 9/2019 | Aihara | H04N 5/2253 |

FOREIGN PATENT DOCUMENTS

WO 2015140514 A1 9/2015

* cited by examiner

*Primary Examiner* — Shahbaz Nazrul

(57) ABSTRACT

Embodiments are disclosed that apply adaptive sub-tiles to captured images for distortion correction in vision-based assistance systems and methods. A captured image is processed to generate corrected tiles, and selected numbers of sub-tiles are used to generate each of the corrected tiles depending upon the pixel densities for regions of the captured image. The corrected sub-tiles are combined to form corrected tiles, and corrected tiles are combined for form a corrected image. The corrected image can be used to output control signals to cause actions to be issued to a user of the system such as a driver of a vehicle. For one embodiment, the corrected tiles are generated one at a time, and corrected sub-tiles for each corrected tile are also generated one at a time based upon individual source data blocks determined by a pre-determined sub-tile configuration. Efficient memory use and data transfers are provided.

20 Claims, 4 Drawing Sheets

ADAPTIVE SUB-TILES FOR DISTORTION CORRECTION IN VISION-BASED ASSISTANCE SYSTEMS AND METHODS

TECHNICAL FIELD

This technical field relates to systems for image correction and vision-based assistance.

BACKGROUND

Many vision-based systems require distortion correction for captured images. For example, many vehicles now include computer vision systems that operate as advanced driver-assistance systems (ADAS). In such compute vision applications, geometric distortion correction is an important processing step if accurate objects are to be identified for vision-based assistance. This distortion correction processing includes mapping the pixels of a captured image from one projection to another projection, and this processing is typically implemented using a dedicated hardware processor within a system-on-a-chip (SoC) integrated circuit. One method for this remapping is to divide the distorted image into a series of tiles. For example, the image can be divided into 64-pixel-by-64-pixel tiles, although other tile sizes can also be used. The hardware processor reads data for the captured image into the local memory one tile at a time and performs the remapping to remove or correct geometric distortion. Corrections for each tile typically include remapping each pixel within the tile to a pixel of a corrected tile for a corrected image, and surrounding pixels can be interpolated as needed.

As compared to prior full-image distortion processing, this tile-based approach to generate a corrected image reduces the bandwidth required for reads from the source frame memory that stores the full captured image. However, the local processor memory required to store and process the image tiles increases with increases in the resolution and field-of-view (FOV) of the camera being used to capture the image. This is so because increases in the FOV of the camera leads to higher distortion in captured images. As resolutions and FOVs increase in vision-based assistance systems, therefore, significant increases are also required in silicon area for integrated circuits used to process the images and correct distortion.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Embodiments are disclosed that apply adaptive sub-tiles to captured images for distortion correction in vision-based assistance systems and methods. A captured image is processed using tiles, and selected numbers of sub-tiles are used to generate each corrected tile depending upon pixel densities associated with regions of the captured image being processed. Sub-tiles can also be selected based upon the nature of the distortion. A variety of embodiments can be implemented and different features and variations can be implemented while still taking advantage of the techniques described herein.

For disclosed embodiments, it is recognized that the pixel density of the image region to be read and processed to remove distortion is not constant and can vary across different regions for a captured image. For the disclosed embodiments, the number of sub-tiles used to generate each corrected tile is selected in part based upon pixel density, which is typically dependent upon the location of the source data within the captured image. For most images captured by an image sensor for a camera, the pixel density is higher in the center of the image and lower at the edge of the image due to the camera lens, the image sensor, and related capture techniques being used.

Thus, for more dense image areas, such as those at the center of the image, the tile requires more local memory for a given tile size. For less dense image areas, such as those at the edge of the image, the tile requires significantly less local memory for a given tile size. As such, the disclosed embodiments generate corrected tiles using selected numbers of sub-tiles based upon pixel densities for the particular region being processed within the captured image. The nature of the distortion can also affect the size of the sub-tiles. For example, a vertical distortion can require additional lines to be fetched as compared to a horizontal distortion. By providing adaptive sub-tile image processing, the disclosed embodiments thereby provide improved flexibility and efficiency in processing and correcting distorted images.

Figure 1:
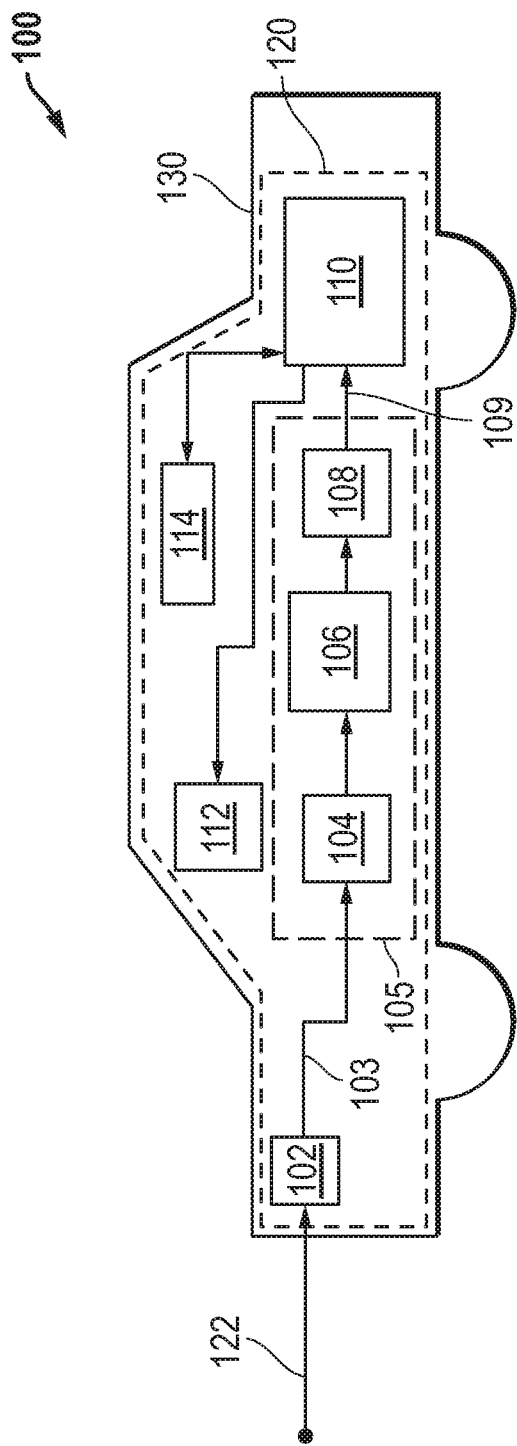
FIG. 1 is a block diagram of an example embodiment for a vehicle including a system that uses selected numbers of sub-tiles for tile-based distortion correction within a captured image.

FIG. 1 is a block diagram of an example embodiment 100 for a vehicle 130 including a system 120 that provides vision-based assistance to a driver of the vehicle 130. The system 120 includes a camera 102 that captures and stores an image 122. The image data 103 for the captured image 122 is read and processed by a correction system 105 to correct distortion within the captured image 122. The correction system 105 includes a processor 106 and a source frame memory 104 that stores the image data 103 for the captured image 122. The source frame memory 104 holds image data 103 for at least one complete camera image or frame. For one example embodiment, pipelining is applied such that while geometric correction is being applied to a current frame, the data of next frame is being stored to provide double buffering. The correction system 105 also includes a memory 108 that stores a corrected image 109, which is read by or otherwise provided to a vision processor 110. It is noted that memory 108 can be implemented in the same memory device that provides the source frame memory 104. For example, a single dual-data-rate (DDR) dynamic-random access-memory (DRAM) device or other memory device can be used to provide the source frame memory 104 and the memory 108. It is further noted that the corrected image 109 can be processed to identify one or more features prior to being provided to the vision processor 110. The vision processor 110 receives the corrected image 109 and uses it to output one or more control signals to cause one or more actions to be issued to a user of the system. For example, the actions can include vibrating a wheel for the vehicle 130, vibrating a seat for the vehicle 130, generating an alarm sound within the vehicle 130, or causing one or more other alerts that can be sensed by the driver or user of the system. Other actions can also be initiated such as direct intervention actions including adjusting steering, engaging an emergency brake, or other direct intervention. For one embodiment, one or more vision-based assistance images can be displayed to the driver of the vehicle 130 through a display 112. In addition, one or more user interfaces 114 can also be included within system 120. For one embodiment, the user interface 114 is implemented as part of the display 112, for example, as a touch screen. The display 112 can be a heads-up display, a rear-view display, or other display. Further, the correction system 105 can be implemented at least in part as a system-on-chip (SoC) integrated circuit. For example, the processor 106 and the vision processor 110 can be implemented on a single integrated circuit and the source frame memory 104 and memory 108 can be implemented on a single memory device. Other variations can also be implemented while still taking advantage of the adaptive sub-tile techniques described herein.

As described herein, the correction system 105 accesses and processes the image data 103 to generate corrected tiles using adaptive sub-tiles. In operation, a captured image 122 is transferred as image data 103 and stored in the source frame memory 104 for the correction system 105. As described further with respect to FIG. 2, the processor 106 reads and processes source data blocks 202 within the image data 103 based upon different numbers of sub-tiles 203, and the different numbers of sub-tiles 203 are selected based upon pixel densities associated with different regions of the captured image 122. The processor 106 then operates to correct distortion within the source data blocks 202 and output corrected sub-tiles that are combined to form corrected tiles 240. During operation, the processor 106 provides one or more control signals to access and process the image data 103 using a series of data transfers from the source frame memory 104 to a source block memory 204. The source block memory 204 holds the source data required to generate one corrected tile or sub-tile. For one embodiment, the size of the source block memory 204 is based upon the highest density zone expected for the captured image 122 and the corresponding sub-tiles being used. It is noted that larger sub-tiles are used for less dense areas of the captured image 122, and smaller sub-tiles are used for more dense areas of the captured image 122. As such, improved, efficient, or optimal use of memory resources is achieved.

For one example embodiment, the source frame memory 104 is a dynamic random access memory (DRAM), such as a dual-data-rate (DDR) DRAM, that stores the entire frame for a captured image 122. The image data 103 stored within the source frame memory 104 is then processed to output one corrected tile at a time, and each corrected tile is generated by processing the image data 104 to generate one corrected sub-tile at a time. The source data used to generate each corrected sub-tile is stored in a memory accessible to the processor 106, such as source block memory 204 in FIG. 2. Source data blocks are processed to correct distortions and generate corrected sub-tiles, and the corrected sub-tiles are combined to form corrected tiles. Corrected tiles including the corrected sub-tiles are stored within the memory 108, which can also be implemented as a DDR DRAM. The corrected tiles are combined to form the corrected image 109.

Figure 2:
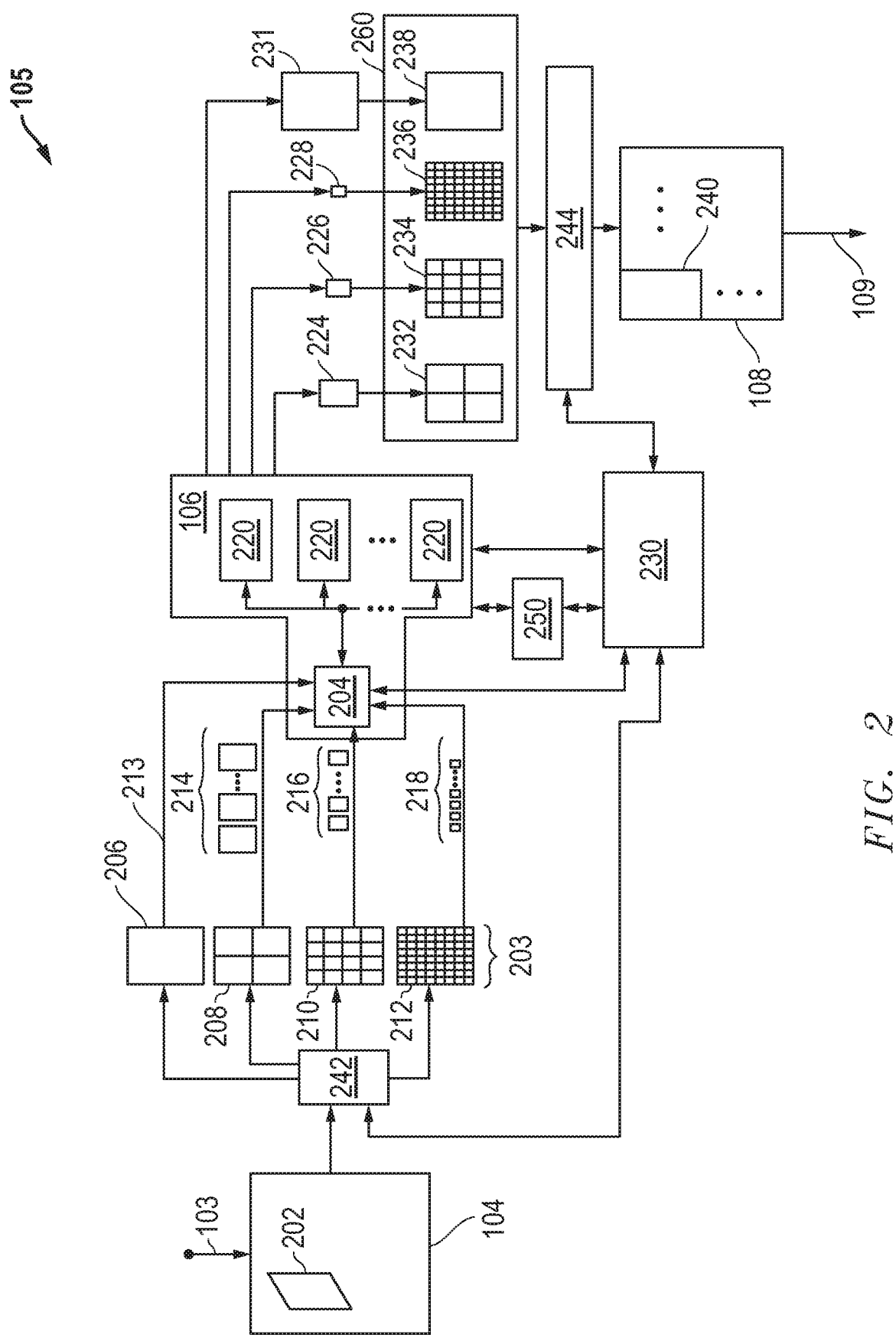
FIG. 2 is a diagram of an example embodiment for processing of a captured image using selected numbers of sub-tiles based upon pixel densities within the captured image.

FIG. 2 is a diagram of an example embodiment 200 for processing of a captured image 122 using adaptive sub-tiles 203. As described above, the captured image 122 is stored as image data 103 within a source frame memory 104. In prior solutions, the image data 103 of the captured image 122 is used to generate corrected tiles; however, image data for all of the tiles are read and processed the same. In contrast for the disclosed embodiments, the correction system 105 processes the image data 103 using source data blocks 202 that are dependent upon different numbers of sub-tiles 203. The sub-tiles 203 are selected based upon the pixel densities associated different regions of the captured image 122. For one example embodiment, an input direct-memory-access (DMA) transfer, as represented by input DMA 242, is used to transfer each source data block 202 from the source frame memory 104 to the source block memory 204. It is noted that the source frame memory 104 can be implemented with a fixed size and is used to store the image data 103 for the captured image 122 as described above. It is further noted that the source block memory 204 for the processor 106 is used to store source data blocks 202. The number of sub-tiles 203 used to generate the corrected tiles 240 is selected from a group of numbers based upon a pixel density associated with the image data 103. For one embodiment, image data 103 for a captured image 122 is four (4) megabytes (MB) or more, and the source block memory 204 is an on-chip synchronous-random-access memory (SRAM) or other memory having a fixed size between 16 kilobytes (KB) to 280 KB. Other sizes can also be used.

It is noted that the adaptive sub-tiles to use for a particular solution are preferably generated offline based upon known parameters for the camera 102 being used within a particular solution. The resulting sub-tile configuration 250 identifies the number of sub-tiles that are to be used to generate each corrected tile for images expected to be captured by the particular camera solutions. The sub-tile configuration 250 also contains parameter data describing how image data is to be corrected to generate corrected sub-tiles. This sub-tile configuration 250, which includes data identifying the number of sub-tiles to be selected for each corrected tile 240, is stored in a memory for use by the control circuit 230 and the processor 106 during operation of the correction system 105. During operation, the control circuit 230 accesses the sub-tile configuration 250 and provides information to the processor 106 to select the particular number of sub-tiles 203 to use to generate corrected tiles 240 associated with the image data 103 stored in source frame memory 104. It is noted that the processor 106 could also be configured to access the sub-tile configuration 250. As described further below, the processor 106 corrects distortions within the sub-tiles, and the corrected sub-tiles are then stored within an output tile buffer 260 before being transferred to the memory 108. Corrected sub-tiles are combined to form corrected tiles 240, and corrected tiles 240 are combined to form a corrected image 109. After the entire image is processed, the corrected image 109 is ultimately output for further processing. The disclosed embodiments provide significant flexibility in the trade-off between memory size and bandwidth required for accessing and processing the image data 103 for the captured image 122.

When the processor 106 processes a source data block 202 within the source frame memory 104, the number of sub-tiles 203 used is selected from a group of numbers, and each corrected sub-tile is generated for a particular corrected tile 240 one at a time. The source data block 202 associated with each of the sub-tiles 203 is stored in the source block memory 204 for processing by the processor 106. The number of sub-tiles 203 is selected based upon the sub-tile configuration 250, which is dependent upon pixel densities for the captured image 122. For the example embodiment depicted, a group of four different numbers of sub-tiles are used with the first number of sub-tiles 206 being one (1) sub-tile, the second number of sub-tiles 208 being four (4) sub-tiles, the third number of sub-tiles 210 being sixteen (16) sub-tiles, and the fourth number of sub-tiles 212 being sixty-four (64) sub-tiles. Larger numbers of sub-tiles are used for regions that have higher pixel density, and smaller numbers of sub-tiles are used for regions that have lower pixel density or resolution. It is noted that different numbers can be used and that more or fewer than four different numbers of sub-tiles can be used as the group of numbers. Still further, a corrected tile could be generated using multiple different sub-tile sizes rather than a single sub-tile size such that a mixture of sub-tile sizes are used to generate the corrected tile. Other variations could also be implemented while still taking advantage of the sub-tile techniques described herein.

Depending upon the number of sub-tiles 203 used to generate a particular corrected tile 240, a different number of data transfers and related processing steps will be used to process the image data 103. For example, where the first number of sub-tiles 206 is used, a single transfer 213 is used to transfer source data block 202 from the source frame memory 104 to the source block memory 204. Where the second number of sub-tiles 208 is used, four data transfers 214 are used to transfer four source data blocks 202 from the source frame memory 104 to the source block memory 204. Where the third number of sub-tiles 210 are used, sixteen data transfers 216 are used to transfer sixteen source data blocks 202 from the source frame memory 104 to the source block memory 204. Where the fourth number of sub-tiles 212 is used, sixty-four (64) are used to transfer sixty-four source data blocks 202 from the source frame memory 104 to the source block memory 204. Each data transfer for the sub-tiles within a number 208, 210, and 212 occur one after another once the previous sub-tile is processed and corrected by the processor 106, for example through remapped pixels.

It is also noted that the size for the source block memory 204 can be selected based upon the highest-density region for the captured mage 122 in a particular camera solution. The source block memory 204 preferably remains fixed, for example, as part of circuitry included in a single SoC integrated circuit. As such, the source block memory 104 will typically remain fixed even when the FOV or resolution of a camera sensor is increased or decreased during operation. However, as the pixel density changes for the image regions being processed, different numbers of sub-tiles 203 are used based upon the sub-tile configuration 250. As described above, the sub-tile configuration 250 provides predetermined selections for numbers of sub-tiles to use for each corrected tiled 240 based upon the camera solution, and the sub-tile configuration 250 is stored for access by the processor 106 during distortion correction processing. For example, the sub-tile configuration 250 is stored in a memory accessible by the processor 106. Other variations can also be implemented.

The processor 106 can implement one or more correction algorithms 220 to provide distortion correction. For example, the correction algorithms 220 can implement one or more geometric distortion correction algorithms to remap pixels from source data blocks 202 to pixels within corrected sub-tiles. For example, the pixels within the source data block 202 for the first number of sub-tiles 206, which is only a single sub-tile 206, are remapped by the correction algorithms 220 to pixels within a corrected sub-tile 231, which also serves as a corrected tile 238. Pixels within each of the source data blocks 202 associated with the second number of sub-tiles 208 are remapped by the correction algorithms 220 to pixels within a corrected sub-tile 224, and the corrected sub-tiles are combined to form a corrected tile 232 once all of the sub-tiles are processed. Pixels within each of the source data blocks 202 associated with the third number of sub-tiles 210 are remapped by the correction algorithms 220 to pixels within a corrected sub-tile 226, and the corrected sub-tiles are combined to form a corrected tile 234 once all of the sub-tiles are processed. Pixels within each of the source data blocks 202 associated with the fourth number of sub-tiles 212 are remapped by the correction algorithms 220 to pixels within a corrected sub-tile 228, and the corrected sub-tiles are combined to form a corrected tile 236 once all of the sub-tiles are processed. The corrected sub-tiles for the selected sub-tile configuration, which could be 224, 226, 228 or 231, is assembled to a complete corrected tile in the output tile buffer 260. For one example embodiment, the output tile buffer 260 is implemented as on chip SRAM. Once a complete corrected tile is assembled, the data is copied from the tile buffer 260 to the memory 108 using the output DMA 244. The output DMA 244 is controlled by the control circuit 230. For one example embodiment, the output tile buffer 260 is dimensioned to hold the data for more than one corrected tile in order to allow transferring the data for the current tile using the output DMA 244 while processing the sub-tiles for the next tile and assembling the next tile in the output buffer 260.

It is noted that a control circuit 230 can also be included within the correction system 105. The control circuit 230 is coupled to the input DMA 242, the processor 106 including the source block memory 204, the output DMA 244, and the memory 108 to facilitate the data transfers and control for the operations of the correction system 105. For one embodiment, the correction system 105, including the processor 106 and the control circuit 230, is implemented using dedicated digital hardware logic circuits to implement the functions described herein. The correction system 105 can also be implemented as a microcontroller, a microprocessor, programmable logic device, or other programmable circuit that executes program instructions stored in a non-volatile data storage medium to carry out the control actions and functions described herein. Further, the source frame memory 104, the source block memory 204, the output tile buffer 260, and the memory 108 can be implemented as one or more data storage mediums configured to store the data described herein. For one embodiment, the source block memory 204 and the output tile buffer 260 is included as on-chip SRAM within an SoC integrated circuit along with the processor 106, and the source frame memory 104 and the memory 108 are included within a single memory integrated circuit such as a DDR DRAM. Other variations can also be implemented while still taking advantage of the techniques described herein.

Figure 3:
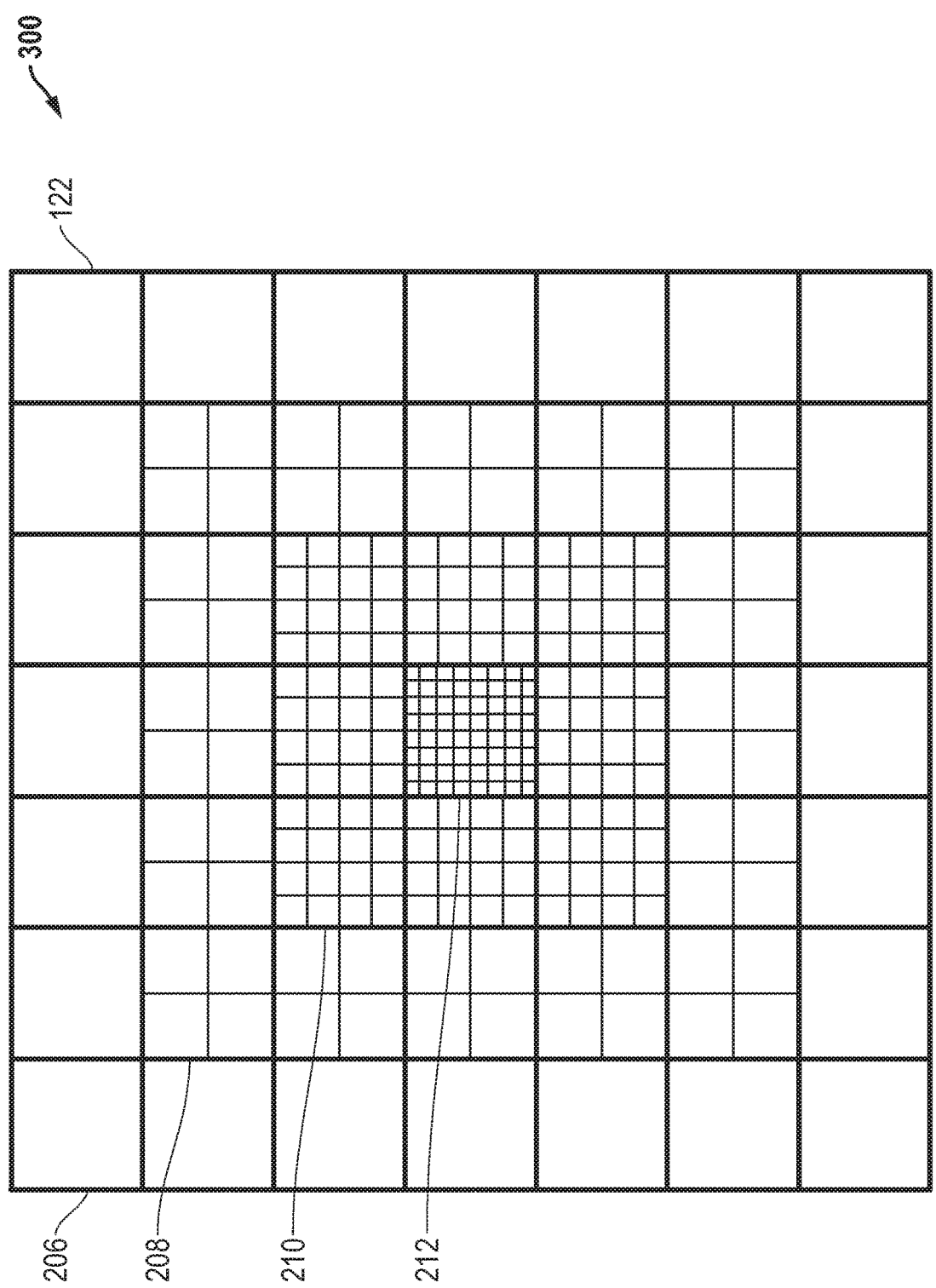
FIG. 3 is a diagram of an example embodiment for selected numbers of sub-tiles selected for a captured image based upon pixel densities within the captured image.

FIG. 3 is a diagram of an example embodiment 300 for different numbers of sub-tiles selected for an example captured image 122. For the example embodiment of FIG. 3, it is assumed that the pixel density for the captured image 122 is higher for center regions of the captured image 122 than for edge regions of the captured image 122. As such, using the example embodiment above with four different numbers of sub-tiles, the fourth number of sub-tiles 212 with the most sub-tiles is selected for the middle tile within the center region of the captured image 122. The third number of sub-tiles 210 is selected for the second-level tiles that are adjacent the middle tile. The second number of sub-tiles 208 is selected for the third-level tiles that are adjacent the second-level tiles. The first number of sub-tiles 208 with the fewest sub-tiles is selected for the edge tiles with the edge region of the captured image 122. It is again noted that different numbers of sub-tiles and different selectable groups of numbers can be used while still taking advantage of the techniques described herein.

As described above, predetermined configuration data for the numbers of sub-tiles can be determined based upon the FOV, the resolution, or other parameters associated with a camera 102 being used for a particular solution. Further, this sub-tile configuration data can be stored within the correction system 105 as sub-tile configuration 250, and the processor 106 or the control circuit 230 can use the sub-tile configuration data to determine the number of sub-tiles 203 used for each of the corrected tiles 240. As described above, this sub-tile selection also determines the data transfers from the source frame memory 104 to the source block memory 204. The predetermined sub-tile configuration 250 can be stored, for example, within a memory or storage medium accessible by the correction system 105. Other variations can also be implemented.

Figure 4:
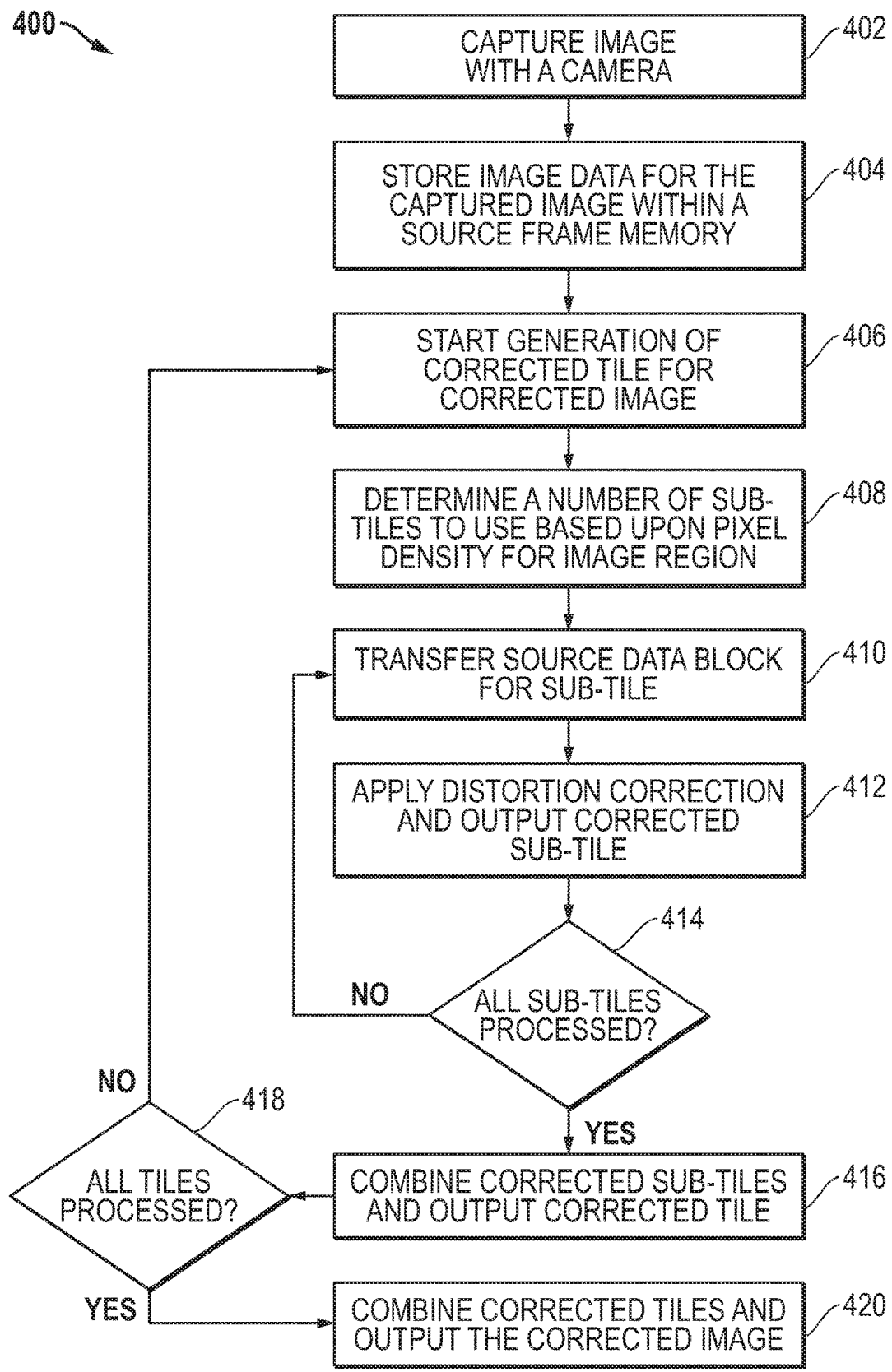
FIG. 4 is a process flow diagram of an example embodiment for tile-based image correction using selected numbers of sub-tiles based upon pixel densities.

FIG. 4 is a process flow diagram of an example embodiment 400 for tile-based image correction using selected numbers of sub-tiles to generate corrected tiles based upon pixel densities. In block 402, an image is captured with a camera. In block 404, image data from the camera is stored within a source frame memory, and the image data represents the captured image. In block 406, generation of a corrected tile for the corrected image is started. In block 408, a number of sub-tiles to use for generation of the corrected tile is determined based upon the pixel density for the image region being processed within the image data. In block 410, the source data block for the sub-tile is transferred, for example, from source frame memory 104 to source block memory 204. In block 412, distortion correction is applied and a corrected sub-tile is generated and output. In block 414, a determination is made whether all sub-tiles for a particular corrected tile have been processed. If "NO," then flow passes back to block 410. If "YES," then flow passes to block 416. In block 416, the corrected sub-tiles are combined, and a corrected tile is output with the corrected sub-tiles. In block 418, a determination is made whether all tiles have been processed. If "NO," then flow passes back to block 406 for generation of the next corrected tile for the corrected image. If "YES," then flow passes to block 420 where the corrected tiles are combined, and a corrected image is output with the corrected tiles. It is noted that additional or different process steps can be used while still taking advantage of the techniques described herein.

As described herein, a variety of embodiments can be implemented and different features and variations can be implemented, as desired.

For one embodiment, a system is disclosed including a camera, a correction system, and a visions processor. The correction system is coupled to receive image data from the camera representing a captured image and to correct distortion within the image data, and the correction system includes a memory coupled to store the image data, a processor coupled to process the image data to correct distortion and to output corrected tiles where the corrected tiles have different numbers of sub-tiles selected from a group of numbers based upon pixel densities associated with different regions of the captured image, and a memory coupled to store a corrected image based upon the corrected tiles. The vision processor is coupled to receive the corrected image from the processor and to cause one or more actions to be issued to a user of the system.

In additional embodiments, the group of numbers of sub-tiles include one sub-tile, four sub-tiles, sixteen sub-tiles, and sixty-four sub-tiles. In further embodiments, at least one of the corrected tiles is generated using multiple different sub-tile sizes. In still further embodiments, three or more different numbers of sub-tiles are selected to be used to generate the corrected tiles.

In additional embodiments, a center region of the captured image has a higher pixel density than an edge region of the captured image, and a larger number of sub-tiles is used for at least one corrected tile associated with the center region as compared to another corrected tile associated with the edge region.

In additional embodiments, sub-tiles for each of the corrected tiles are generated by the processor one at a time, and the sub-tiles are combined to form the corrected tiles. In further embodiments, the sub-tiles used by the processor are dependent upon a predetermined sub-tile configuration stored within the system.

For one embodiment, a circuit to correct distortion is disclosed including a memory coupled to store image data representing a captured image, a processor coupled to process the image data to correct distortion and to output corrected tiles where the corrected tiles have different numbers of sub-tiles selected from a group of numbers based upon pixel densities associated with different regions of the captured image, and a memory coupled to store a corrected image based upon the corrected tiles.

In additional embodiments, at least one of the corrected tiles is generated using multiple different sub-tile sizes. In further embodiments, three or more different numbers of sub-tiles are selected to be used to generate the corrected tiles.

In additional embodiments, a center region of the captured image has a higher pixel density than an edge region of the captured image, and a larger number of sub-tiles is used for at least one corrected tile associated with the center region as compared to another corrected tile associated with the edge region.

In additional embodiments, sub-tiles for each of the corrected tiles are generated by the processor one at a time, and wherein the sub-tiles are combined to form the corrected tiles. In further embodiments, source data blocks from the image data associated with the sub-tiles are stored in a source block memory for the processor, the source block memory having a fixed size.

In additional embodiments, the sub-tiles used by the processor are dependent upon a predetermined sub-tile configuration.

For one embodiment, a method to correct image distortion is disclosed including storing image data from a camera within a memory, the image data representing the captured image, processing the image data to correct distortion and to generate corrected tiles using different numbers of sub-tiles selected from a group of numbers based upon pixel densities associated with different regions of the captured image, and combining the corrected tiles to output a corrected image. In further embodiments, the method includes causing one or more actions to be issued to a user based upon the corrected image.

In additional embodiments, the processing includes generating the corrected tiles one at a time. In further embodiments, the method includes processing sub-tiles for each corrected tile one at a time to generate corrected sub-tiles and combining the corrected sub-tiles to generate the corrected tile.

In additional embodiments, a center region of the captured image has a higher pixel density than an edge region of the captured image, and a larger number of sub-tiles is used for at least one corrected tile associated with the center region as compared to another corrected tile associated with the edge region.

In additional embodiments, the method includes accessing a predetermined sub-tile configuration to determine a number of sub-tiles to use to generate each corrected tile.

It is further noted that the functional blocks, components, systems, devices, or circuitry described herein can be implemented using hardware, software, or a combination of hardware and software along with analog circuitry as needed. For example, the disclosed embodiments can be implemented using one or more integrated circuits that are programmed to perform the functions, tasks, methods, actions, or other operational features described herein for the disclosed embodiments. The one or more integrated circuits can include, for example, one or more processors or configurable logic devices (CLDs) or a combination thereof. The one or more processors can be, for example, one or more central processing units (CPUs), control circuits, microcontroller, microprocessors, hardware accelerators, ASICs (application specific integrated circuit), or other integrated processing devices. The one or more CLDs can be, for example, one or more CPLDs (complex programmable logic devices), FPGAs (field programmable gate arrays), PLAs (programmable logic array), reconfigurable logic circuits, or other integrated logic devices. Further, the integrated circuits, including the one or more processors, can be programmed to execute software, firmware, code, or other program instructions that are embodied in one or more non-transitory tangible computer-readable mediums to perform the functions, tasks, methods, actions, or other operational features described herein for the disclosed embodiments. The integrated circuits, including the one or more CLDs, can also be programmed using logic code, logic definitions, hardware description languages, configuration files, or other logic instructions that are embodied in one or more non-transitory tangible computer-readable mediums to perform the functions, tasks, methods, actions, or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A system, comprising:
a camera;
a correction system coupled to receive image data from the camera representing a captured image and to correct distortion within the image data, the correction system comprising:
a memory coupled to store the image data;
a processor coupled to process the image data to correct distortion and to output corrected tiles, the corrected tiles having different numbers of sub-tiles selected from a group of numbers based upon pixel densities associated with different regions of the captured image; and
a memory coupled to store a corrected image based upon the corrected tiles; and
a vision processor coupled to receive the corrected image from the processor and to cause one or more actions to be issued to a user of the system.

2. The system of claim 1, wherein the group of numbers of sub-tiles comprises one sub-tile, four sub-tiles, sixteen sub-tiles, and sixty-four sub-tiles.

3. The system of claim 1, wherein at least one of the corrected tiles is generated using multiple different sub-tile sizes.

4. The system of claim 1, wherein three or more different numbers of sub-tiles are selected to be used to generate the corrected tiles.

5. The system of claim 1, wherein a center region of the captured image has a higher pixel density than an edge region of the captured image, and wherein a larger number of sub-tiles is used for at least one corrected tile associated with the center region as compared to another corrected tile associated with the edge region.

6. The system of claim 1, wherein sub-tiles for each of the corrected tiles are generated by the processor one at a time, and wherein the sub-tiles are combined to form the corrected tiles.

7. The system of claim 1, wherein the sub-tiles used by the processor are dependent upon a predetermined sub-tile configuration stored within the system.

8. A circuit to correct distortion, comprising
a memory coupled to store image data representing a captured image;
a processor coupled to process the image data to correct distortion and to output corrected tiles, the corrected tiles having different numbers of sub-tiles selected from a group of numbers based upon pixel densities associated with different regions of the captured image; and
a memory coupled to store a corrected image based upon the corrected tiles.

9. The circuit of claim 8, wherein at least one of the corrected tiles is generated using multiple different sub-tile sizes.

10. The circuit of claim 8, wherein three or more different numbers of sub-tiles are selected to be used to generate the corrected tiles.

11. The circuit of claim 8, wherein a center region of the captured image has a higher pixel density than an edge region of the captured image, and wherein a larger number of sub-tiles is used for at least one corrected tile associated with the center region as compared to another corrected tile associated with the edge region.

12. The circuit of claim 8, wherein sub-tiles for each of the corrected tiles are generated by the processor one at a time, and wherein the sub-tiles are combined to form the corrected tiles.

13. The circuit of claim 12, wherein source data blocks from the image data associated with the sub-tiles are stored in a source block memory for the processor, the source block memory having a fixed size.

14. The circuit of claim 8, wherein the sub-tiles used by the processor are dependent upon a predetermined sub-tile configuration.

15. A method to correct image distortion, comprising:
    storing image data from a camera within a memory, the image data representing the captured image;
    processing the image data to correct distortion and to generate corrected tiles using different numbers of sub-tiles selected from a group of numbers based upon pixel densities associated with different regions of the captured image; and
    combining the corrected tiles to output a corrected image.

16. The method of claim 15, further comprising causing one or more actions to be issued to a user based upon the corrected image.

17. The method of claim 15, wherein the processing comprises generating the corrected tiles one at a time.

18. The method of claim 17, further comprising processing sub-tiles for each corrected tile one at a time to generate corrected sub-tiles and combining the corrected sub-tiles to generate the corrected tile.

19. The method of claim 15, wherein a center region of the captured image has a higher pixel density than an edge region of the captured image, and wherein a larger number of sub-tiles is used for at least one corrected tile associated with the center region as compared to another corrected tile associated with the edge region.

20. The method of claim 15, further comprising accessing a predetermined sub-tile configuration to determine a number of sub-tiles to use to generate each corrected tile.

* * * * *